United States Patent
Mulder et al.

(10) Patent No.: US 6,724,773 B1
(45) Date of Patent: Apr. 20, 2004

(54) ARRANGEMENT COMPRISING ELECTRONIC DEVICES EXCHANGING INFORMATION

(75) Inventors: Jacob Mulder, Eindhoven (NL); John J. Soree, Eindhoven (NL); Wilhelmus H. C. Knubben, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/537,823

(22) Filed: Mar. 29, 2000

(30) Foreign Application Priority Data

Apr. 7, 1999 (EP) .............................. 99201098

(51) Int. Cl.$^7$ .............................. H04L 12/43
(52) U.S. Cl. .................. 370/458; 370/468; 370/503
(58) Field of Search ................ 370/282, 294, 370/376, 442, 458, 459, 468, 498, 503, 504

(56) References Cited

U.S. PATENT DOCUMENTS

| | | | | |
|---|---|---|---|---|
| 4,253,185 A | * | 2/1981 | Danielsen | 375/293 |
| 4,953,160 A | * | 8/1990 | Gupta | 370/494 |
| 5,025,443 A | * | 6/1991 | Gupta | 370/494 |
| 5,297,099 A | * | 3/1994 | Bolan et al. | 365/229 |
| 5,398,326 A | * | 3/1995 | Lee | 711/115 |
| 5,469,285 A | * | 11/1995 | Gut | 398/41 |
| 5,509,011 A | * | 4/1996 | Birth | 370/498 |
| 5,666,355 A | * | 9/1997 | Huah et al. | 370/311 |
| 6,141,763 A | * | 10/2000 | Smith et al. | 713/300 |

FOREIGN PATENT DOCUMENTS

WO WO 98 26352 A 6/1998

* cited by examiner

*Primary Examiner*—Chi Pham
*Assistant Examiner*—Anh-Vu H Ly
(74) *Attorney, Agent, or Firm*—Peter Zawilski

(57) ABSTRACT

In a transmission system in which information is transmitted from a first device (2) to a second device (6) and vice versa, use is made of a first part ($t_0$–$t_3$) of a timeslot to transmit data from the first device (2) to the second device (6) and of a second part ($t_3$–$t_4$) of the timeslot to transmit data from the second device (6) to the first device (2). To obtain correct operation of the system, the second device (6) is synchronized to the first device (2). This is done using a phase locked loop (78) which locks on the signal present on the interconnection lines between the first device (2) and the second device (6). To ensure reliable synchronization, the second part of the timeslot ($t_3$–$t_4$) ends before the beginning ($t_5$) of the first part of the next timeslot; and a rising edge is presented at the beginning ($t_5$) of the first part of each new timeslot.

11 Claims, 6 Drawing Sheets

ARRANGEMENT COMPRISING ELECTRONIC DEVICES EXCHANGING INFORMATION

BACKGROUND OF THE INVENTION

The present invention relates to an arrangement comprising a first device being coupled to a second device for exchanging information in a sequence of time slots, said arrangement being arranged for transmitting a signal representing at least one digital symbol from the first device to the second device in a first part of a timeslot and for transmitting a signal representing at least one digital symbol from the second device to the first device in a second part of the timeslot.

The present invention also relates to devices to be used in such an arrangement.

An arrangement according to the preamble is known from the PCT patent application published under number WO 98/488452.

The arrangement according to the above mentioned patent application can be used for interconnection of electronic devices such as integrated circuits on a printed circuit board. In present day systems, it is often required that electronic devices exchange digital information. This can e.g. be control information, or it can be digital information to be passed on by the second device, as is the case in a line interface for a telecommunication device such as a modem.

In general it is desired to use only a small numbers of interconnections between the electronic devices, because this saves pins and external coupling components. To reduce the number of pins and/or the number of external components, in the arrangement according to the prior art, information is transmitted from the first device to the second device during a first part of a timeslot, and information is transmitted from the second device to the first device during a second part of the timeslot.

This way of using the interconnection between the first and second device requires that the second device is synchronized with the first device. This can be done by using a phase locked loop in the second device that locks on the data received from the first device. In the arrangement according to above mentioned patent application in one out of four timeslots a special synchronization sequence is transmitted by the first device to ensure synchronization.

SUMMARY OF THE INVENTION

The introduction of the special synchronization sequence has the disadvantage that the timeslot is not completely available for data. Furthermore buffering of data may be necessary to deal with data that is generated in the timeslot being used for synchronization.

The object of the present invention is to provide an arrangement according to the preamble in which the use of the special synchronization sequence is not necessary.

To achieve said object, the arrangement according to the invention is characterized in that the second device comprises control means for terminating the transmission of the at least one digital symbol from the second device to the first device before the end of the second part of the timeslot, and in that the first device comprises further control means for introducing a level change at the beginning of the first part of the time slot.

By terminating the transmission from the second device to the first device before the end of the present timeslot the signal at the input of the second device has a predetermined level at the end of the current timeslot. This makes it possible that the next time slot starts with a level change caused by the transmission of data by the first device. The first device should start its transmission with a level different from the level at the end of the previous timeslot. In this way the second device receives a signal which changes level at the beginning of a time slot. Such a signal is very suitable to synchronize a phase locked loop, making that the special synchronization sequence can be dispensed with.

An embodiment of the present invention is characterized in that the signal representing the digital symbol transmitted in the first part of the timeslot has a same value at the beginning of the first part of a timeslot.

By using a constant value of the signal representing the digital symbol transmitted in the first part of the timeslot, always a same type of edge is present at the beginning of the timeslot. This can be always a rising edge or a falling edge. The use of a same type of edge results in a simplification of the phase locked loop required to synchronize on the received signal.

A further embodiment of the invention is characterized in that the first transmitter is arranged for changing the value of its output signal at an instant within the first part of the timeslot, said instant being determined by the value of the digital symbol to be transmitted.

By encoding a symbol by changing the instant on which the symbol changes, it is obtained that an easy detection of the corresponding symbol is possible in the second device. If the change takes place at a predetermined instant for one symbol value and at a later instant for another symbol value, the value of the transmitted symbol can easily be determined by determining the level of the signal after said predetermined instant but before said later instant.

The arrangement according to the present invention can advantageously be used in a system in which the power required for the second device is (partly) derived from the data signal it receives. In particular this is the case when the communication has to take place over an isolating barrier such as a transformer or a plurality of capacitors. The use of isolating barriers is common in equipment that is connected to the public telephone network such as modems, ISDN or ADSL/HDSL adapters for use in PC's.

BRIEF DESCRIPTION OF THE DRAWINGS

The present invention will now be explained with reference to the drawing figures.

DETAILED DESCRIPTION

Figure 1:
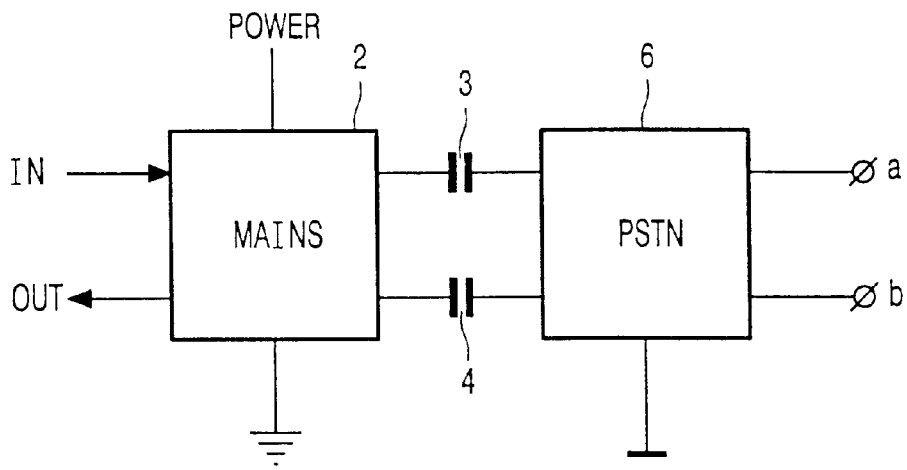
FIG. 1 shows a high level block diagram of an arrangement according to the invention.

The arrangement according to FIG. 1 can be applied in modems or other devices in which transmission of digital signals over an isolating barrier is necessary. This is required in communication equipment which is connected to the public telephone network. The reason for this is that it has to be prevented that, due to equipment failure, the user can touch parts which are directly connected to the telephone line.

The arrangement according to FIG. 1 comprises a mains device 2 which receives its supply from the mains and a line device 6 which is connected to a telephone line. A signal IN to be transmitted by the mains device 2 is converted into a symmetric signal and is passed via the capacitors 3 and 4 to the line device 6. The transmission of the signal IN is done in a first part of a timeslot. It is also possible that the data signal transmitted via the capacitors 3 and 4 is used in the line device 6 for derivation of a supply voltage.

A signal to be transmitted from the line device 6 to the mains device 2 is also transmitted over the capacitors 3 and 4, but now in a second part of the timeslot. This signal is received by the mains device 2, and made available at an output terminal OUT.

The line device 6 also comprises circuitry to interface to a telephone line at terminals a and b. In case analog signals have to be transmitted over the capacitors 3 and 4, the mains device 2 and the line device 6 comprise analog to digital converters and digital to analog converters. Advantageously sigma-delta modulators are used for this purpose, because sigma-delta modulators generate high frequency data signals, which can easily be passed over capacitors 3 and 4 having a small capacitance value.

Figure 2:
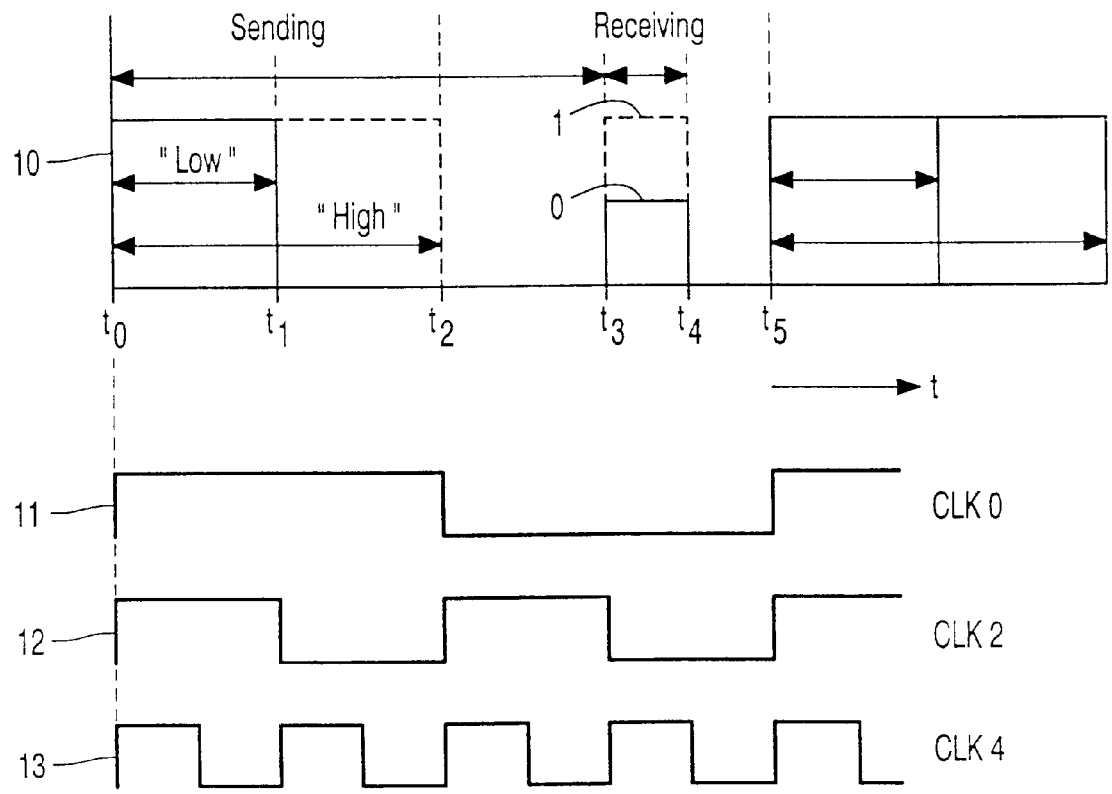
FIG. 2 shows the timing of the signals transmitted over the capacitors 3 and 4.

In the timing diagram according to FIG. 2 the timing of the signals transmitted over the capacitors 3 and 4 is shown. The signal is constituted of a plurality of subsequent timeslot as is shown in graph 10. The timeslot starts at $t_0$ and ends at $t_5$. The first part of the timeslot is from $t_0$ to $t_3$, and the second part of the timeslot is from $t_3$ to $t_5$. The actual transmission in the first timeslot takes place between $t_0$ and $t_2$. The period between $t_2$ and $t_3$ is necessary in order to have sufficient time available for charging the capacitors 3 and 4.

The interval between $t_3$ and $t_4$ is available for transmitting signals from the line device 6 to the mains device 2. The transmission of data from the line device 6 to the mains device 2 is indicated in FIG. 2. If a logical value "1" is transmitted by the line device 6, the voltage between the input/output terminals of the mains device 2 has first value, and if a logical value "0" is transmitted by the line device 6, the voltage between the input/output terminals of the mains device 2 has a second value different from the first value.

According to the inventive concept of the present invention, no signals are transmitted between $t_4$ and $t_5$ enabling that a level change introduced at instant $t_5$ is always noticeable for a PLL which is used to synchronize the line device 6 to the mains device 2.

Preferably, the value of the signal generated by the mains device 6 between instants to and $t_2$ has a constant value (solid line) when a logical value "1" is transmitted, and the value of the signal changes at $t_1$ from a first value to a second value (dotted line).

In graphs 11, 12 and 13 clock signals CLK0, CLK2 and CLK4 are shown. These clock signals can be used to control the mains device 2 and the line device 6. In the line device 6, the clock signals have to be extracted from the signals received from the mains device 2. The different parts of the timeslot can be identified from the levels of the clock signals CLK0, CLK2 and CLK4. In Table 1 below the relation between the important parts of the timeslot and the levels of the clock signals is given.

TABLE 1

| Part of timeslot | Level CLK0 | Level CLK2 | Level CLK4 |
| --- | --- | --- | --- |
| $t_0 < t < t_2$ | "1" | x | x |
| $t_0 < t < t_1$ | "1" | "1" | X |
| $t_1 < t < t_2$ | "1" | "0" | X |
| $t_3 < t < t_4$ | "0" | "0" | "1" |

Figure 3:
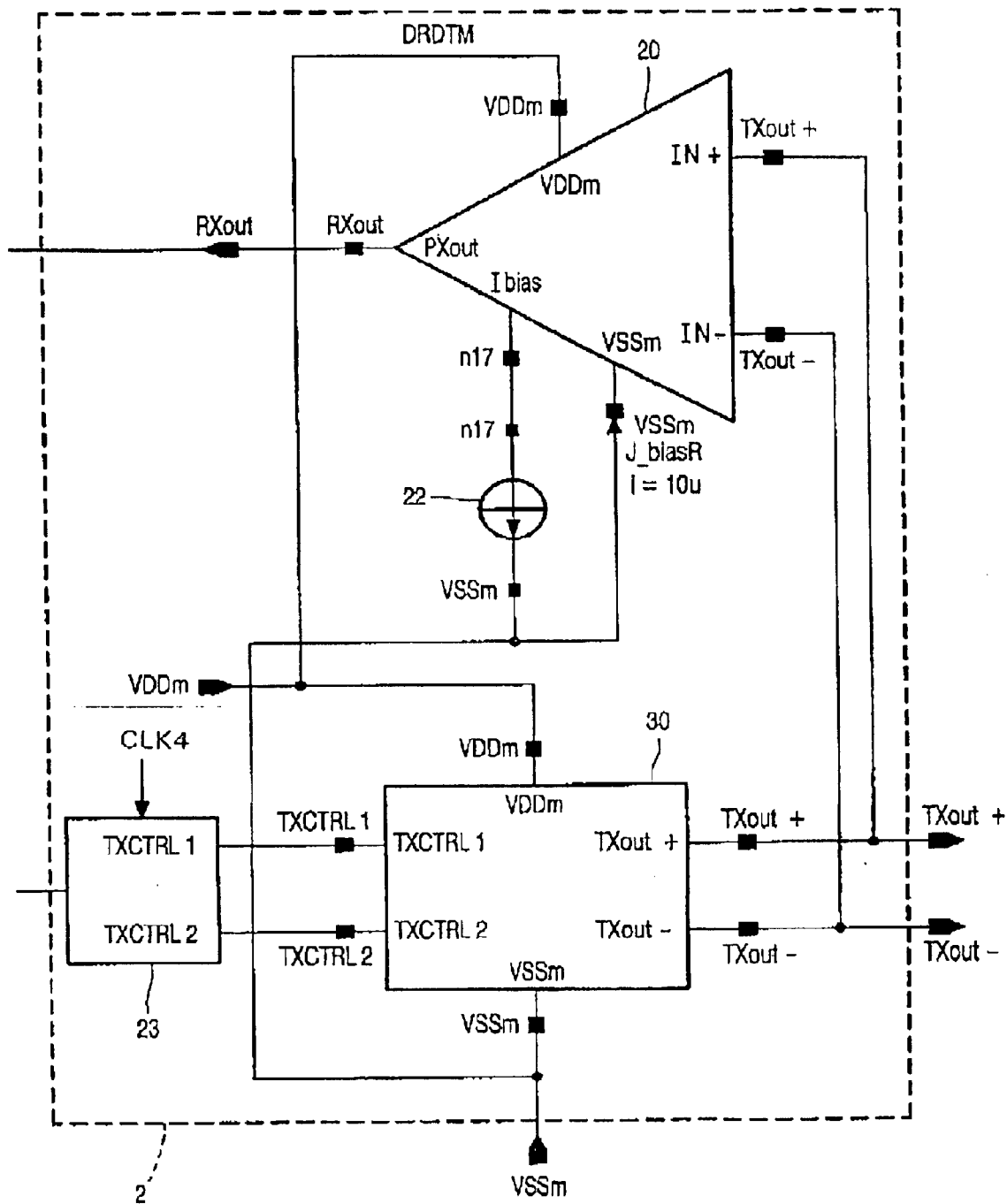
FIG. 3 shows a block diagram of the mains device 2 in FIG. 1.

In the mains device 2 according to FIG. 3, a signal to be transmitted to the line device 6 is applied to a first input of a the first control means being here a controller 23. The clock signal CLK4 is applied to a second input of the controller 23. The controller 23 derives the clock signals CLK2 and CLK0 from the clock signal CLK4 by using simple frequency dividers. The controller 23 also generates two control signals TXCTRL1 and TXCTRL2 which are applied to the first transmitter which is here a transmit driver 30. The signals TXCRTL1 and TXCRTL2 are discussed later in more detail.

The transmit driver 30 is arranged for transmitting data to the line device 6. The transmit driver 30 has three possible states. In a first state a first output TXOUT+ is connected to the positive supply voltage VDD and a second output is connected to the negative supply voltage VSS. In a second state the first output TXOUT+ is connected to the negative supply voltage VSS and the second output is connected to the positive supply voltage VDD. In a third state the terminals TXOUT+ and TXOUT− are floating, enabling the mains device 2 to receive information from the line device 6.

The terminals TXOUT+ and TXOUT− are also connected to inputs IN+ and IN− of a receiver 20. The receiver 20 is arranged for receiving a signal which is transmitted by the line device 6 in the period from $t_3$ and $t_4$. A current source 22 provides a bias current to the receiver 20. The receiver 20 makes the signal received from the line device available at its output.

Figure 4:
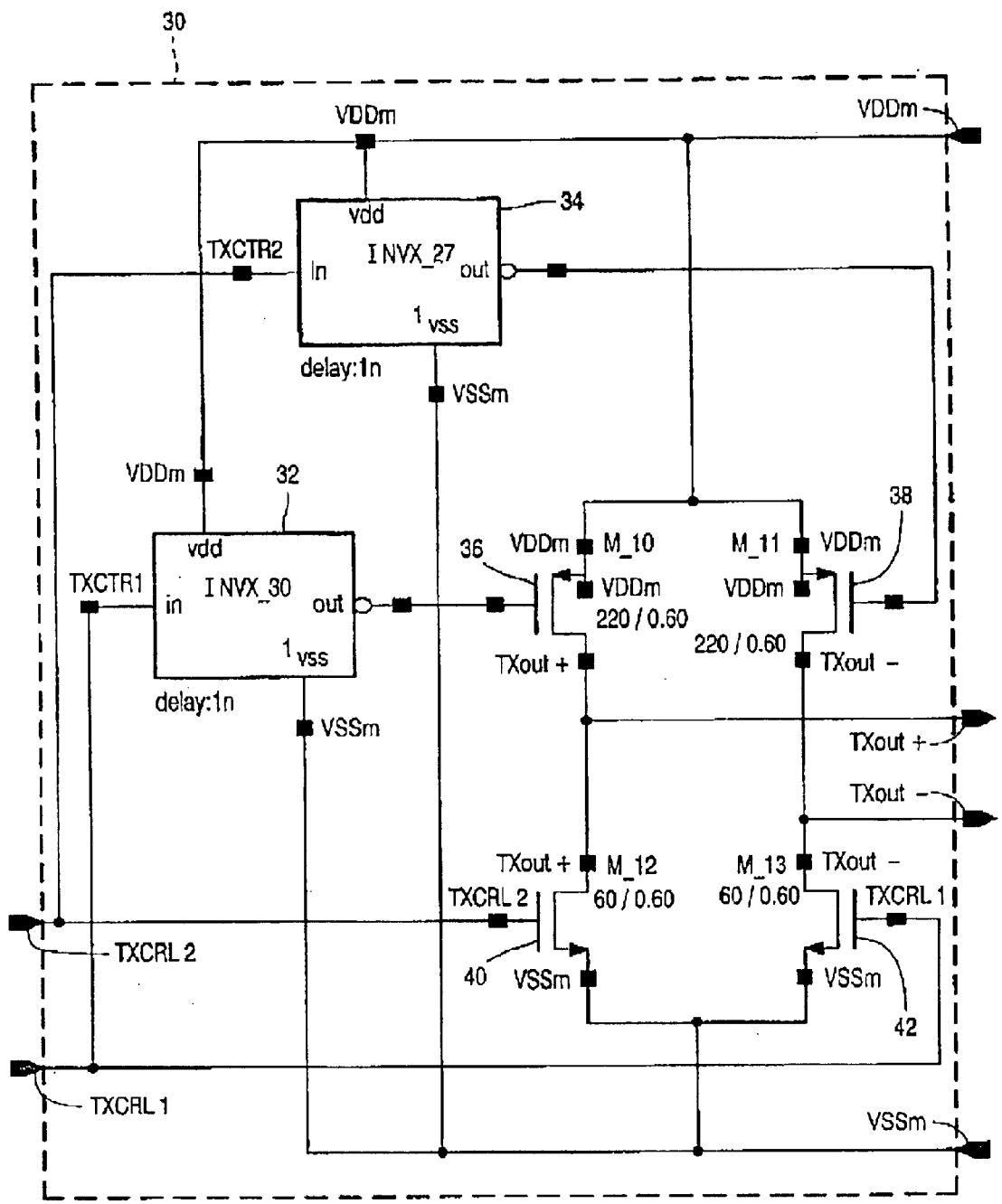
FIG. 4 shows a circuit diagram of the transmit driver 30 to be used in the mains device 2 according to FIG. 3.

In the transmit driver 30 according to FIG. 4, the signal XCTRL2 is connected to a gate of an N-MOS transistor 40 and to an input of an inverter 34. The signal XCTRL1 is connected to a gate of an N-MOS transistor 42 and to an input of an inverter 32. A source electrode of the N-MOS transistors 40 and 42 is connected to the negative supply voltage VSS. A drain electrode of the N-MOS transistor 40 is connected to the output terminal TXOUT+ and to a drain electrode of a P-MOS transistor 36. A drain electrode of the N-MOS transistor 42 is connected to the output terminal TXOUT− and to a drain electrode of a P-MOS transistor 38. An output of the inverter 32 is connected to a gate electrode of the P-MOS transistor 36 and an output of the inverter 34 is connected to a gate electrode of the P-MOS transistor 38.

If the signals TXCTRL1 and TXCTRL2 have a logical value "0", the gate voltage of the N-MOS transistors 40 and 42 are substantially equal to VSS. Consequently these N-MOS transistors are not conducting. The output signals of the inverters 32 and 34 will have a logical value "1" causing the gate voltages of the P-MOS transistors 36 and 38 to be substantially equal to VDD. Consequently, the P-MOS transistors 36 and 38 will not be conducting. This all will result that the terminals TXOUT+ and TXOUT− are floating when the logic level of the signals TXCTRL1 and TXCTRL2 is equal to "0". This should be the case from $t_3$ to $t_4$.

If the signal TXCTRL1 has a value "1" and the signal TXCTRL2 has a value "0" the N-MOS transistor 42 will be conducting, and N-MOS transistor 40 will not be conducting. The output signals of the inverters 32 and 34 will have logic values of respectively "0" and "1". Consequently, the P-MOS transistor 36 will conduct and the P-MOS transistor 38 will not conduct. The result is that the output TXOUT+ is connected to the voltage VDD and the output TXOUT− is connected to the voltage VSS. This situation should occur from $t_0$ to $t_1$ if the symbol offered at the input TXIN has a value "0" and from $t_0$ to $t_2$ if the symbol offered at the input TXIN has a value "1".

If the signal TXCTRL1 has a value "0" and the signal TXCTRL2 has a value "1", the N-MOS transistor 40 and the P-MOS transistor 38 will be conducting and the N-MOS transistor 42 and the P-MOS transistor 36 will not be conducting. The result is now that the output TXOUT+ is connected to the voltage VSS and the output TXOUT− is connected to the voltage VDD. This situation should occur from $t_1$ to $t_2$ if the symbol offered at the input TXIN has a value "0" and, independent from the value of TXIN, from $t_4$ to $t_5$. The signals TXCTRL1 and TXCTRL2 can be derived from the clock signals CLK0, CLK2 and CLK2 according to:

$$TXCTRL1 = CLK0 \cdot CLK2 + CLK0 \cdot TXDATA \quad (1)$$

$$TXCTRL2 = \overline{TXCTRL1 + (CLK0 + CLK2 + \overline{CLK4})}$$

Figure 5:
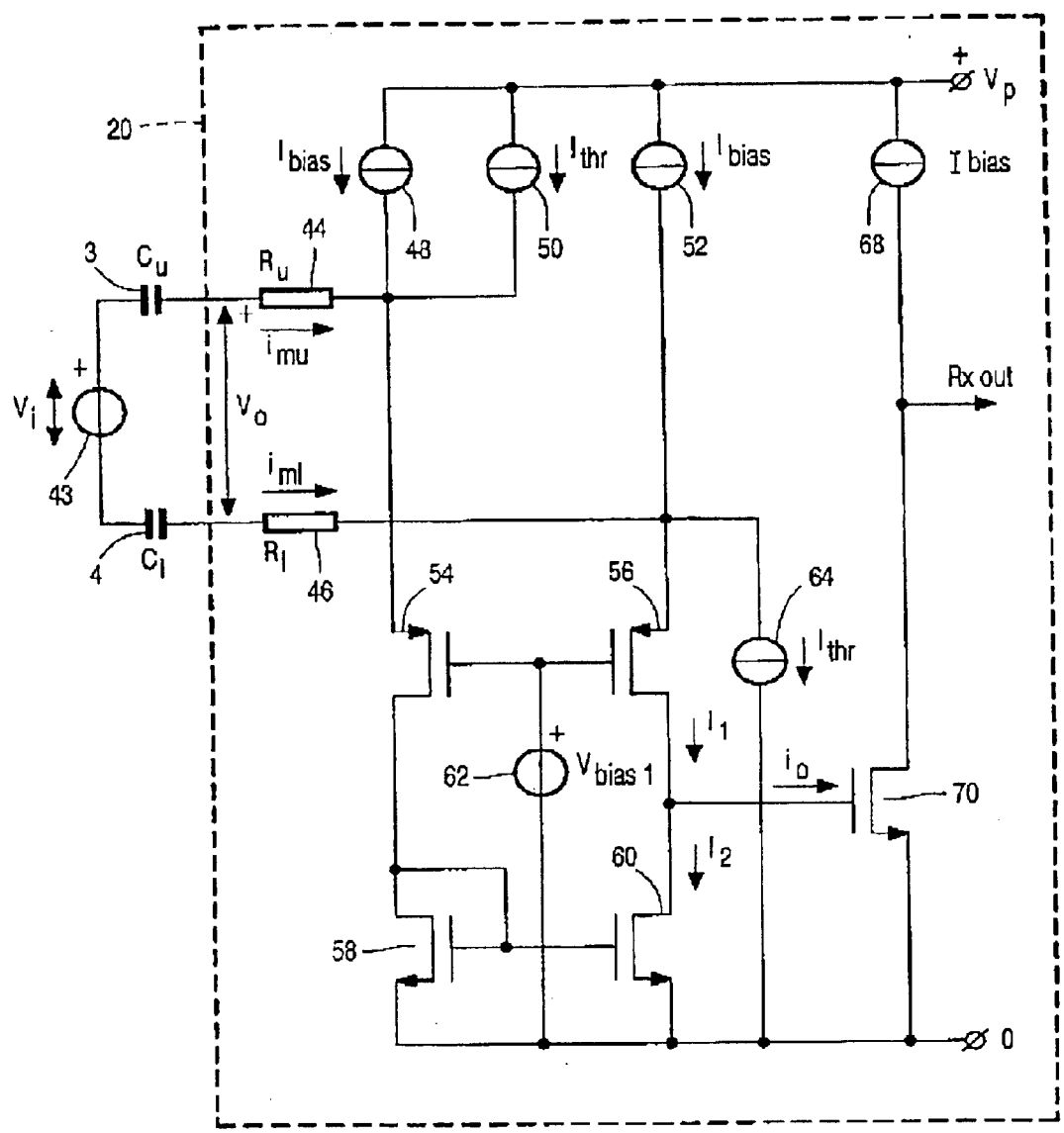
FIG. 5 shows a circuit diagram of the receiver 20 to be used in the mains device 2 according to FIG. 3.

A first input of the receiver 20 according to FIG. 5 is connected to a first terminal of a resistor 44 and a second input of the receiver 20 is connected to a first terminal of a resistor 46. A second terminal of the resistor 44 is connected to a first terminal of a current source 48, to a first terminal of a current source 50 and to a source terminal of a P-MOS transistor 54. A second terminal of the resistor 46 is connected to a first terminal of a current source 52, to a first terminal of a current source 64 and to a source terminal of a P-MOS transistor 56.

The gate electrodes of the P-MOS transistors 54 and 56 are connected to a first terminal of a reference voltage source 62. The drain electrode of the P-MOS transistor 54 is connected to an input of a current mirror consisting of two N-MOS transistors 58 and 60. The output of the current mirror constituted by the drain electrode of the N-MOS transistor 60 is connected to the drain of the P-MOS transistor 56 and to the gate electrode of a N-MOS transistor 70. The drain electrode of the N-MOS transistor 70 is connected to the output of the receiver 20 and to a first terminal of a current source 68.

Second terminals of the current sources 48, 50 52 and 68 are connected to a positive supply voltage and the source electrodes of the N-MOS transistors 58, 60 and 70, the second terminal of the current source 64 and the second terminal of the bias voltage source are connected to a negative supply voltage.

For explanation reasons, the capacitors 3 and 4 and a voltage source $v_i$ representing the signal generated by the line device 6 are also displayed in FIG. 5. It is assumed that the source terminals of the P-MOS transistors 54 and 56 absorb all current applied to them, and that the voltages on said source terminals are equal.

Initially a current $i_{mu=iml}$ will flow trough the resistors 44 and 46. This current $i_{mu}$ will be equal to $V_O/(R_u+R_l)$. Consequently, the current $i_{ml}$ is equal to $-V_O/(R_u+R_l)$. These currents result in an imaginary current $I_{O=I1}-I_2$ causing the voltage on output terminal RXOUT to approximate VSS if $I_O>0$ and to approximate VDD if $I_O<0$. This imaginary output current can be used to determine the optimum value for $I_{thr}$. For the output current $I_O$ can be written:

$$I_O=I_1-I_2=(I_{bias}-I_{thr}+I_{ml})-(I_{bias}+I_{thr}+I_{mu})=I_{ml}-I_{mu}-2\cdot I_{thr} \quad (2)$$

Choosing $R_u=R_l=R$, and substituting the expressions for the currents $I_{mu}$ and $I_{ml}$ into (2) gives:

$$I_O=-V_i/R-2\cdot I_{thr} \quad (3)$$

At $t_3$, which marks the end of the transmission phase of the mains device, the voltage $V_O$ at the input of the receiver equals $-V_m$, in which $V_m$ is the supply voltage of the mains device 2. The voltage $V_i$ is equal to $-V_p$ with $V_p$ being the supply voltage of the line device 6. Provided $C_u=C_l$ the voltage difference between $V_i$ and $V_O$ is equally divided over the capacitors 3 and 4. In the transmission phase of the line device 6, this line device can put its supply voltage or inverted supply voltage on the capacitors 3 and 4. Consequently the voltage $V_i$ can assume the values $-V_m$ or $-V_m+2\cdot V_p$. For the possible values of $I_O$ can now be written:

$$I_O=V_m/R-2\cdot I_{thr}$$

or $$I_O=V_m/R-2\cdot V_p/R-2\cdot I_{thr} \quad (3)$$

From (4) the optimum value of $I_{thr}$ can be determined as $(V_m-V_p)/2\cdot R$.

Replacing the voltage source $V_i$ by an open or short circuit is also possible to transmit binary information.

Figure 6:
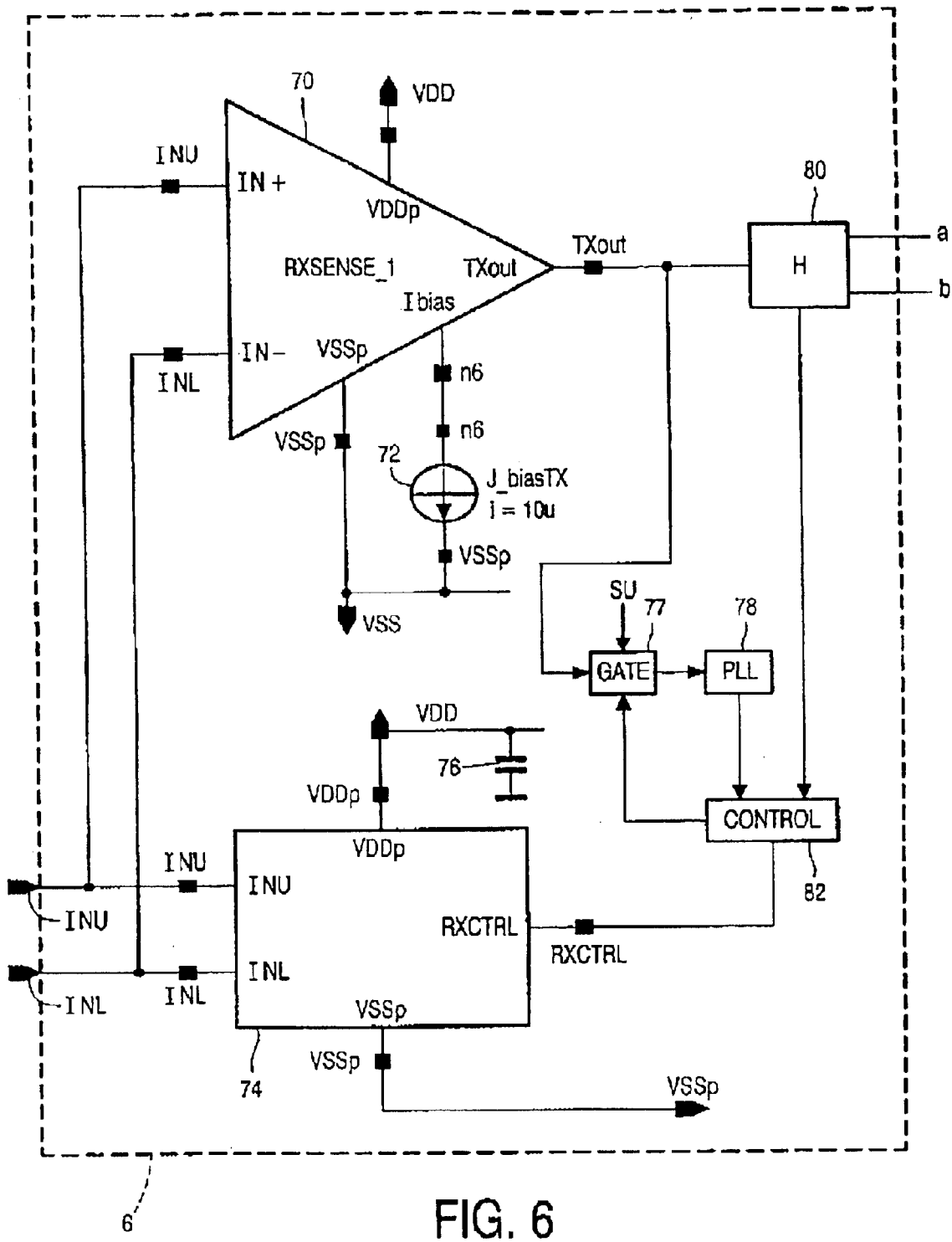
FIG. 6 shows a block diagram of the line device 6 in FIG. 1.

A terminal INU of the line device 6 according to FIG. 6 is connected to a first input of a controlled rectifier bridge 74, to a first input of a receiver 70. A terminal INL is connected to a second input of the controlled rectifier bridge 74, to a second input of the receiver 70.

The controlled rectifier bridge 74 is arranged for rectifying the signal between the terminals INU and INL for providing a supply voltage VDD for the remaining circuitry in the line device 6. The receiver 70 is arranged for deriving a data signal to be transmitted to a telephone line from the data signal received from the mains device. It comprises a simple slicer with center value zero which determines the sign of its input signal at an instant halfway $t_1$ and $t_2$ (FIG. 2).

The output of the receiver 70 is connected to a line interface 80 which can comprise a (sigma-delta) D/A converter and a hybrid when the line device has to be connected to an analog PSTN. The line interface 80 is connected to the a and b wires of a PSTN.

An output of the line interface 80 is connected to a control unit 82. This output of the line interface carries a digital signal 80, which has to be transmitted to the mains device 2. This output is connected to a first input of a control device 82. An output of the control device 82 is connected to an input of the controlled rectifier bridge 74. This control signal is used control the rectifier bridge 74 when the line device 6 transmits to the mains device between instants $t_3$ and $t_4$.

The output of the receiver 70 is also connected to an input of a gating device 77. An output of the gating device 77 is connected to an input of a phase locked loop 78.

The phase locked loop 78 locks to the rising edge always present at $t_0$, $t_5$, etc. and generates replicas of the clock signals CLK0, CLK2, and CLK4 used in the mains device. These clock signals are provided to the control unit 82 that derives several control signals from these clock signals. One of these control signals is a gating signal which is applied to the gating device 77 to ensure that, according to the present invention, always a rising edge at regular intervals occurs and that undesired edges in the input signal are suppressed. These undesired edges are caused by the transmission from the line device 6 to the mains device 2 and occur at instants $t_3$ and $t_4$. The gate signal is derived from the clock signals CLK0, CLK2 and CLK4 according to:

$$\text{GATE} = CLK0 \cdot CLK2 \cdot CLK4 + \overline{CLK0} \cdot \overline{CLK2} \cdot \overline{CLK4} \qquad (5)$$

At start up of the system, the gating is disabled, which means that the complete signal at the output of the receiver 70 is passed to the input of the phase locked loop 77. As the line device 6 does not transmit data to the mains device 2 during the start up phase, at the input of the phase locked loop only the signal transmitted by the mains device 2 is present. Consequently, during the start up phase no undesired edges are present in the input signal of the phase locked loop.

Due to the presence of edges at regular distances, and the absence of unwanted edges, it is obtained that the phase locked loop locks reliably on its input signal.

The phase locked loop comprises a phase detector and a frequency detector. The latter is present to increase the lock speed at larger frequency offsets. The phase detector in the PLL is arranged to be only sensitive for a rising edge. This type of phase detector is well known to those skilled in the art.

Figure 7:
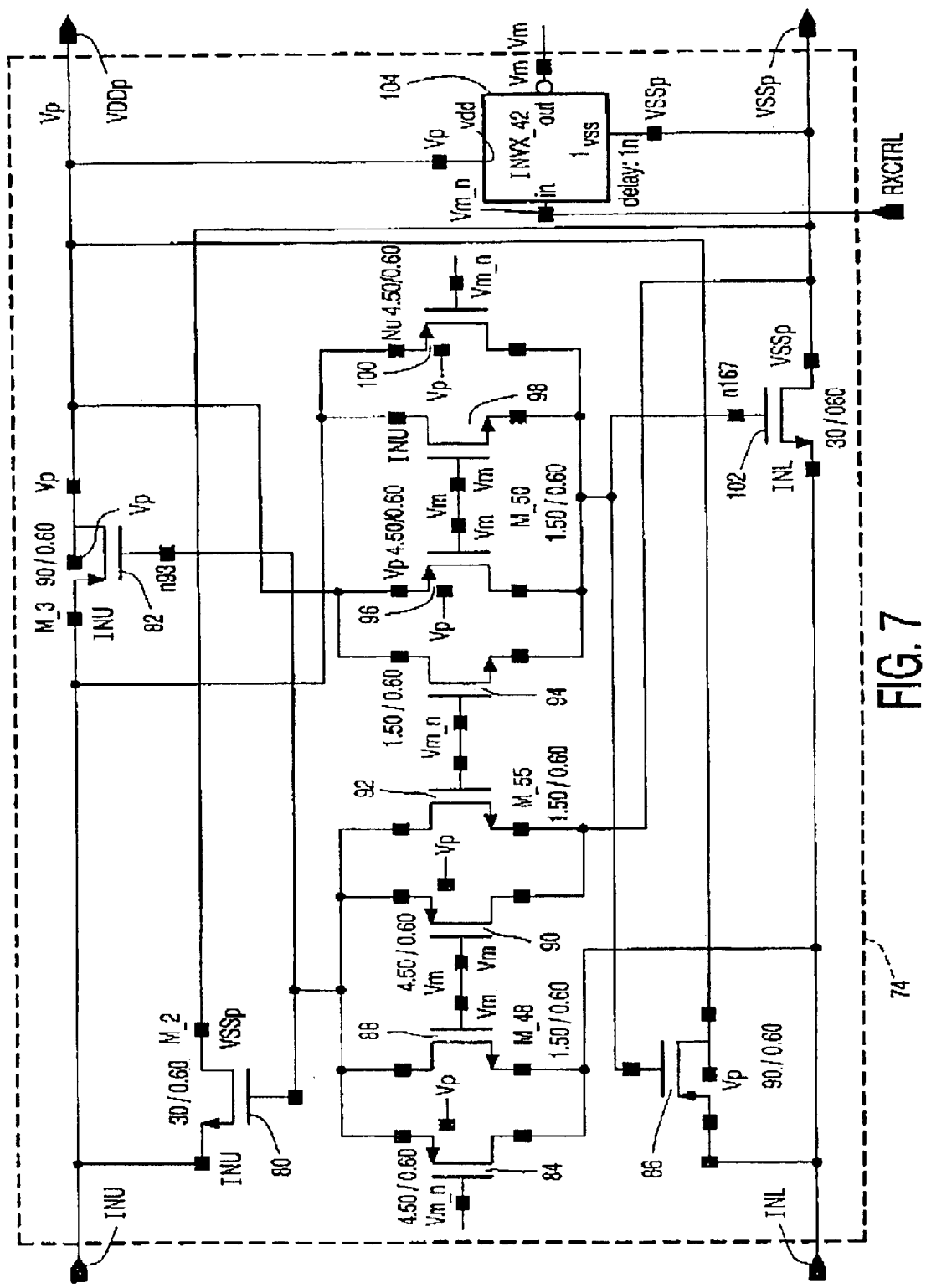
FIG. 7 shows a circuit diagram of the active bridge 74 to be used in the line device 6 according to FIG. 6.

In the controlled rectifier bridge 74 according to FIG. 7, an input terminal INU is connected to a source electrode of a N-MOS transistor 80 and to a source electrode of a P-MOS transistor 82. A drain electrode of the N-MOS transistor 80 is connected to a first output terminal VSSp and a drain electrode of the P-MOS transistor 82 is connected to a second output terminal VDDp. An input terminal INL is connected to a source electrode of a P-MOS transistor 86 and to a source electrode of a N-MOS transistor 102. A drain electrode of the P-MOS transistor 86 is connected to a first output terminal VDDp and a drain electrode of the N-MOS transistor 102 is connected to the second output terminal VSSp.

The gate electrodes of N-MOS transistor 80 and P-MOS transistor 82 are connected via a parallel connection of a P-MOS transistor 84 and an N-MOS transistor 88 to the input terminal INL. The gate electrodes of N-MOS transistor 80 and P-MOS transistor 82 are further connected via a parallel connection of a P-MOS transistor 90 and an N-MOS transistor 92 to the output terminal VSSp.

The gate electrodes of N-MOS transistor 102 and the P-MOS transistor 86 are connected via a parallel connection of a P-MOS transistor 100 and an N-MOS transistor 98 to the input terminal INU. The gate electrodes of N-MOS transistor 102 and the P-MOS transistor 86 are further connected via a parallel connection of a P-MOS transistor 96 and an N-MOS transistor 94 to the output terminal VDDp.

The control signal RXCTRL is connected to an input of an inverter and to the gates of the P-MOS transistors 84 and 100 and to the gates of the N-MOS transistors 92 and 94. The output of the inverter 104 is connected to the gates of the P-MOS transistors 90 and 96 and to the gates of the N-MOS transistors 88 and 98.

When the line device 6 is receiving information from the mains device, the control signal RXCTRL has a logic level "0" corresponding to a voltage VSSp. The output signal of the inverter 104 then has a logic level "1" corresponding to a voltage VDDp. This makes that the N-MOS transistors 88 and 98 and the P-MOS transistors 84 and 100 conduct. Consequently, the gates of the P-MOS transistors 80 and 82 are connected to the terminal INL and the gates of the N-MOS transistors 86 and 102 are connected to the terminal UNL. In this way the bridge 74 operates as a well-known active rectifier bridge which rectifies the AC voltage between the terminals INU and INL. In the circuit according to FIG. 7 parallel connected N-MOS and P-MOS transistors are used in the switching part in order to ensure that the gates of the transistors 80, 82, 86 and 102 are connected correctly for both polarities of the voltage between the terminals INU and INL.

When the line device 6 is transmitting information to the mains device and the signal RXCTRL is "0", the controlled bridge acts as a switch which connects the terminal VDDp to the terminal INU and connects the terminal VSSp to the terminal INL. When the signal RXCTRL is "1", the controlled bridge acts as a switch which connects the terminal VDDp to the terminal INL and connects the terminal VSSp to the terminal INU. In this way information can be transmitted to the mains device 2 by the line device 6. The voltage put on the terminals INU and INL by the mains device corresponds to the voltage $V_i$ in FIG. 5.

What is claimed is:

1. Arrangement comprising a first device being coupled to a second device for exchanging information in a sequence of time slots, said first device comprises a first transmitter for transmitting a signal representing at least one digital symbol from the first device to the second device in a first part of a timeslot and the second device comprises a second transmitter for transmitting a signal representing at least one digital symbol from the second device to the first device in a second part of the timeslot characterized in that the second device comprises control means for terminating the transmission of the at least one digital symbol from the second device to the first device before the end of the second part of the timeslot, and in that the first device comprises further control means for always introducing a level change at the beginning of the first part of the time slot, regardless of the value of the at least one digital symbol transmitted by the first transmitter, and further characterized in that the second transmitter is adapted to provide data without transmitting a synchronizing signal.

2. Arrangement according to claim 1, characterized in that the signal representing the digital symbol transmitted in the first part of the timeslot has a predetermined value at the beginning of the first part of a timeslot.

3. Arrangement according to claim 2, characterized in that the first transmitter is arranged for changing the value of its output signal at an instant within the first part of the timeslot, said instant being determined by the value of the digital symbol to be transmitted.

4. Arrangement according to claim 1, characterized in that the second device comprises power extraction means for deriving a supply voltage from a signal representing the at least one digital symbol received from the first device.

5. Arrangement according to claim 1, characterized in that the second device is coupled to the first device via an insulating barrier.

6. Device being arranged for exchanging information in a sequence of time slots with a second device, said device comprising a first transmitter for transmitting at least one digital symbol in a first part of a timeslot and a receiver for receiving at least one digital symbol in a second part of the timeslot characterized in that the device comprises further control means for always introducing a level change at the beginning of the first part of the time slot, regardless of the value of the at least one digital symbol transmitted by the first transmitter, and in that the device is arranged for receiving a signal which terminated before the end of the second part of the timeslot, and further characterized in that the first receiver is adapted to receive data without receiving a synchronizing signal from the second device.

7. Device according to claim 6, characterized in that the first transmitter is arranged for changing the value of its output signal at an instant within the first part of the timeslot, said instant being determined by the value of the digital symbol to be transmitted.

8. Device being coupled to a first device for exchanging information in a sequence of time slots, said device being arranged for receiving a signal representing at least one digital symbol in a first part of a timeslot and for transmitting a signal representing at least one digital symbol in a second part of the timeslot characterized in that the device comprises control means for terminating the transmission of the at least one digital symbol before the end of the second part of the timeslot, and in that the device is arranged for receiving a signal always having a level change at the beginning of the first part of the time slot, regardless of the value of the at least one digital symbol transmitted by the first transmitter and further characterized in that the device is adapted to provide data without transmitting a synchronizing signal.

9. Device according to claim 8, characterized in that the device comprises power extraction means for deriving a supply voltage from a signal representing the at least on digital symbol received from the first device.

10. Device according to claim 8, characterized in that the device is arranged for receiving a signal representing the digital symbol transmitted in the first part of the timeslot having a same value at the beginning of the first part of a timeslot.

11. Device according to claim 10, characterized in that the device is arranged for receiving a signal changing its value at an instant within the first part of the timeslot, said instant being determined by the value of the digital symbol carried by the signal.

* * * * *